(12) United States Patent
Jodoin et al.

(10) Patent No.: US 11,281,457 B2
(45) Date of Patent: Mar. 22, 2022

(54) DEPLOYMENT OF INFRASTRUCTURE IN PIPELINES

(71) Applicant: Amazon Technologies, Inc., Seattle, WA (US)

(72) Inventors: Felix Walter Blue Jodoin, Seattle, WA (US); Maxwell Bartholomew Hall, Seattle, WA (US); Martin Robert Frank, Bainbridge Island, WA (US); James William Lewis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/426,564

(22) Filed: May 30, 2019

(65) Prior Publication Data

US 2019/0317757 A1  Oct. 17, 2019

Related U.S. Application Data

(63) Continuation of application No. 15/679,087, filed on Aug. 16, 2017, now Pat. No. 10,318,285.

(51) Int. Cl.
*G06F 9/44* (2018.01)
*G06F 9/445* (2018.01)
(Continued)

(52) U.S. Cl.
CPC .................. *G06F 8/71* (2013.01); *G06F 8/40* (2013.01); *G06F 8/60* (2013.01); *G06F 11/3612* (2013.01);
(Continued)

(58) Field of Classification Search
CPC ..... G06F 8/60; G06F 8/71; G06F 8/65; G06F 8/00; G06F 8/77; G06F 8/70; G06F 11/36;
(Continued)

(56) References Cited

U.S. PATENT DOCUMENTS 7,752,606 B2 *  7/2010  Savage ..................... G06F 8/20
                                                    717/100
8,126,768 B2    2/2012  Mehrotra et al.
(Continued)

OTHER PUBLICATIONS

Jun Yao et al., Optimal Pipeline Depth with Pipeline Stage Unification Adoption, Dec. 2007, [Retrieved on Oct. 25, 2021], Retrieved from the internet: <URL: https://dl.acm.org/doi/pdf/10.1145/1360464.1360470> 7 Pages (3-9) (Year: 2007).*

(Continued)

*Primary Examiner* — Anibal Rivera
(74) *Attorney, Agent, or Firm* — Davis Wright Tremaine LLP

(57) ABSTRACT

A system, such as a system of a computing resource service provider, detects changes to a pipeline template package that encodes information associated with application code and infrastructure that may be utilized as part of deploying the application code in stages of a pipeline. An infrastructure template that is usable to provision an execution environment may be generated for a corresponding stage of the development, and may be utilized as part of a process for provisioning an execution environment which may, for example, run tests to verify the quality of the application code.

20 Claims, 8 Drawing Sheets

(51) Int. Cl.

| | | |
|---|---|---|
| *G06F 8/71* | (2018.01) | |
| *G06F 8/60* | (2018.01) | |
| *G06F 8/40* | (2018.01) | |
| *G06F 11/36* | (2006.01) | |
| *G06F 9/455* | (2018.01) | |
| *G06F 8/77* | (2018.01) | |
| *G06F 8/65* | (2018.01) | |
| *G06F 9/50* | (2006.01) | |
| *G06F 8/36* | (2018.01) | |
| *G06F 8/20* | (2018.01) | |
| *G06F 8/61* | (2018.01) | |
| *G06F 8/38* | (2018.01) | |

(52) U.S. Cl.
CPC ...... *G06F 11/3684* (2013.01); *G06F 11/3688* (2013.01); *G06F 8/20* (2013.01); *G06F 8/36* (2013.01); *G06F 8/38* (2013.01); *G06F 8/61* (2013.01); *G06F 8/65* (2013.01); *G06F 8/77* (2013.01); *G06F 9/45558* (2013.01); *G06F 9/5072* (2013.01); *G06F 11/3664* (2013.01)

(58) Field of Classification Search
CPC ........ G06F 9/507; G06F 9/5072; G06F 3/048; G06F 3/04817; G06F 9/5061; G06F 8/40; G06F 8/61; G06F 8/36; G06F 8/38; G06F 8/20; G06F 11/3612; G06F 11/3684; G06F 11/3688; G06F 11/3692; G06F 11/3664; G06F 9/45558; G06F 9/4411; G06F 9/5038; G06F 9/454
See application file for complete search history.

(56) References Cited

U.S. PATENT DOCUMENTS

| | | | |
|---|---|---|---|
| 8,276,152 B2 | 9/2012 | Sanghvi et al. | |
| 8,347,402 B2 | 1/2013 | Imrey et al. | |
| 8,677,315 B1 | 3/2014 | Anderson et al. | |
| 8,719,782 B2* | 5/2014 | DeHaan | G06F 9/45533 |
| | | | 713/100 |
| 8,843,889 B2* | 9/2014 | Anderson | G06F 8/70 |
| | | | 717/120 |
| 9,021,458 B1 | 4/2015 | Jacob et al. | |
| 9,047,133 B2 | 6/2015 | Winterfeldt et al. | |
| 9,052,961 B2 | 6/2015 | Mangtani et al. | |
| 9,170,798 B2 | 10/2015 | Nagaraja et al. | |
| 9,626,283 B1* | 4/2017 | Zlatnik | G06Q 10/06 |
| 9,710,259 B2 | 7/2017 | Nagaraja et al. | |
| 9,749,195 B2 | 8/2017 | Cimprich et al. | |
| 9,853,868 B2 | 12/2017 | Cimprich et al. | |
| 9,916,133 B2 | 3/2018 | Jubran et al. | |
| 2004/0044555 A1* | 3/2004 | Bangs | G06Q 10/06393 |
| | | | 705/7.12 |
| 2006/0069605 A1 | 3/2006 | Hatoun | |
| 2006/0235732 A1* | 10/2006 | Miller | G06Q 10/10 |
| | | | 705/7.23 |
| 2007/0011650 A1 | 1/2007 | Hage et al. | |
| 2007/0038977 A1* | 2/2007 | Savage | G06F 8/20 |
| | | | 717/106 |
| 2007/0265900 A1 | 11/2007 | Moore | |
| 2009/0150887 A1 | 6/2009 | Sanghvi et al. | |
| 2011/0107299 A1* | 5/2011 | Dehaan | G06F 9/45533 |
| | | | 717/121 |
| 2011/0179280 A1 | 7/2011 | Imrey et al. | |
| 2012/0331150 A1 | 12/2012 | Rao | |
| 2013/0103444 A1* | 4/2013 | Agarwal | G06Q 10/06312 |
| | | | 705/7.14 |
| 2013/0124807 A1* | 5/2013 | Nielsen | G06F 11/1438 |
| | | | 711/162 |
| 2013/0268913 A1* | 10/2013 | Anderson | G06F 8/70 |
| | | | 717/120 |
| 2014/0282353 A1 | 9/2014 | Jubran et al. | |
| 2015/0142949 A1 | 5/2015 | Nair | |
| 2015/0286558 A1 | 10/2015 | Bartlow et al. | |
| 2015/0326522 A1 | 11/2015 | Pu et al. | |
| 2016/0132806 A1* | 5/2016 | To | G06Q 10/06313 |
| | | | 705/7.23 |
| 2016/0164723 A1 | 6/2016 | Cimprich et al. | |
| 2016/0337356 A1* | 11/2016 | Simon | H04L 63/10 |
| 2017/0091071 A1 | 3/2017 | Chitale et al. | |
| 2017/0201425 A1 | 7/2017 | Marinelli et al. | |
| 2017/0286266 A1 | 10/2017 | Rivera et al. | |
| 2017/0288967 A1 | 10/2017 | Naqvi et al. | |
| 2018/0024731 A1 | 1/2018 | Sanches et al. | |
| 2018/0101371 A1* | 4/2018 | Flanakin | G06F 8/36 |

OTHER PUBLICATIONS

Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Atkinson, R., "Security Architecture for the Internet Protocol," Request for Comments: 1825, Standards Track, Aug. 1995, 23 pages.
BLake-Wilson et al., "Elliptic Curve Cryptography (ECC) Cipher Suites for Transport Layer Security (TLS)," Request for Comments: 4492, Informational, May 2006, 35 pages.
Blake-Wilson et al., "Transport Layer Security (TLS) Extensions," Request for Comments: 3546, Standards Track, Jun. 2003, 29 pages.
Blake-Wilson et al., "Transport Layer Security (TLS) Extensions," Request for Comments: 4366, Standards Track, Apr. 2006, 30 pages.
Blumenthal et al., "Pre-Shared Key (PSK) Ciphersuites with NULL Encryption for Transport Layer Security (TLS)," Request for Comments: 4785, Standards Track, Jan. 2007, 5 pages.
Boehm et al., "Cost Models for Future Software Life Cycles Processes: COCOMO 2.0," Annals of Software Engineering 1(1):57-94, Dec. 1, 1995.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 7 pages.
Dierks et al., "The TLS Protocol Version 1.0," Request for Comments 2246, Jan. 1999, 75 pages.
Dierks et al., "The Transport Layer Security (TLS) Protocol Version 1.2," Request for Comments 5246, Standards Track, Aug. 2008, 98 pages.
Eastlake, "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments 4279, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hailpern et al., "Model-driven development: The good, the bad, and the ugly," IBM Systems Journal 45(3):451-61, Jul. 11, 2006.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Kanno et al., "Addition of the Camellia Cipher Suites to Transport Layer Security (TLS)," Request for Comments: 6367, Informational, Sep. 2011, 8 pages.

(56) References Cited

OTHER PUBLICATIONS

Karn, P., et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 6 pages.
Kent et al., "Security Architecture for the Internet Protocol," Request for Comments: 2401, Standards Track, Nov. 1998, 62 pages.
Kent, S., "IP Encapsulating Security Payload (ESP)," Request for Comments: 4303, Standards Track, Dec. 2005, 45 pages.
Kent, S., and K. Seo, "Security Architecture for the Internet Protocol," Request for Comments: 4301, Standards Track, Dec. 2005, 102 pages.
Khare et al., "Upgrading to TLS within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 9 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 8 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments 5764, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Metzger, P., et al., "IP Authentication Using Keyed MD5," Request for Comments: 1828, Standards Track, Aug. 1995, 6 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 15 pages.
Orman, H., "The OAKLEY Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments 5238, May 2008, 11 pages.
Rescorla et al., "Datagram Transport Layer Security Version 1.2," Request for Comments 6347, Jan. 2012, 33 pages.
Rescorla et al., "Datagram Transport Layer Security," Request for Comments: 4347, Standards Track, Apr. 2006, 25 pages.
Rescorla et al., "Transport Layer Security (TLS) Renegotiation Indication Extension," Request for Comments: 5746, Standards Track, Feb. 2010, 15 pages.
Rescorla, "HTTP Over TLS," Request for Comments: 2818, Informational, May 2000, 7 pages.
Rescorla, "TLS Elliptic Curve Cipher Suites with SHA-256/384 and AES Galois Counter Mode (GCM)," Request for Comments: 5289, Informational, Aug. 2008, 6 pages.
Salowey et al., "Transport Layer Security (TLS) Session Resumption without Server-Side State," Request for Comments: 5077, Standards Track, Jan. 2008, 20 pages.
Salowey, "AES Galois Counter Mode (GCM) Cipher Suites for TLS," Request for Comments: 5288, Standards Track, Aug. 2008, 8 pages.
Salter et al., "Suite B Profile for Transport Layer Security (TLS)," Request for Comments: 6460, Informational, Jan. 2012, 14 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 9 pages.
Taylor et al., "Using the Secure Remote Password (SRP) Protocol for TLS Authentication," Request for Comments: 5054, Informational, Nov. 2007, 24 pages.
Tuexen et al., "Datagram Transport Layer Security (DTLS) for Stream Control Transmission Protocol (SCTP)," Request for Comments 6083, Jan. 2011, 10 pages.
Turner et al., "Prohibiting Secure Sockets Layer (SSL) Version 2.0," Request for Comments 6176, Mar. 2011, 4 pages.

* cited by examiner

DEPLOYMENT OF INFRASTRUCTURE IN PIPELINES

CROSS-REFERENCE TO RELATED APPLICATIONS

This application is a continuation of U.S. patent application Ser. No. 15/679,087, filed on Aug. 16, 2017, now U.S. Pat. No. 10,318,285, entitled "DEPLOYMENT OF INFRASTRUCTURE IN PIPELINES," the content of which is incorporated herein by reference in its entirety for all purposes.

BACKGROUND

Configuring resources in complex and multiple computing environments such as in various stages of the deployment of software in a distributed computing environment is complex and challenging. In many cases, resource configuration changes such as creation and update of computing environments, monitors, and resources are manually created and updated by engineers. This process may be error-prone, resulting in inconsistencies in configurations between various environments, and may even result in deployment failures, such as where dependencies between resources may vary between different computing environments.

As a result, engineers can spend several days configuring the systems and services needed to host even a simple service. Further, once deployed, updating an application, changing the configuration of the underlying systems and services, or deploying the application to additional systems or locations can also require substantial amounts of engineer time. For example, assume an enterprise wants to deploy a retail shopping website, where the website is backed by web-servers, application servers, and database applications deployed using services offered by a computing resource service provider. In many cases, engineers will manually configure and provision a variety of virtual machine instances (or classes of instances) with the desired web and application server applications, provide the content for these systems, configure network addresses, configure database and storage services, provision security mechanisms (e.g., provisioning SSL certificates on all public facing systems), configure administrative and role based access controls, configure and launch load balancing systems, scaling groups, as well as configure monitoring, logging, and reporting applications. Once deployed, adding features or updating the software used to provide a public facing service (e.g., the retail web site) can require similar levels of configuration and provisioning.

BRIEF DESCRIPTION OF THE DRAWINGS

Various techniques will be described with reference to the drawings, in which.

DETAILED DESCRIPTION

Figure 1:
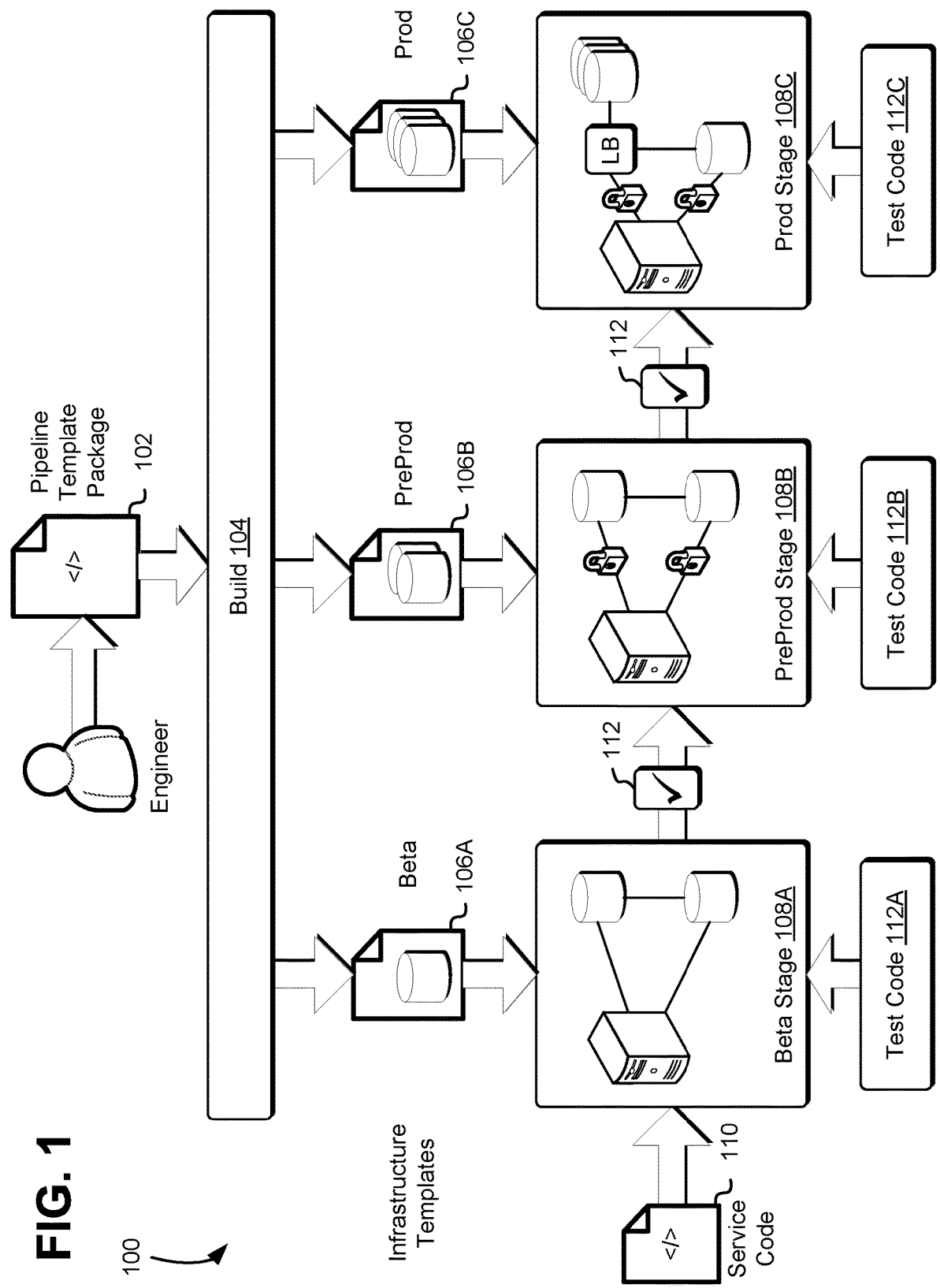
FIG. 1 illustrates a diagram of an infrastructure-enabled pipeline that orchestrates resource configuration changes across multiple stages of a pipeline.

In an embodiment, a pipeline refers to a process flow that describes how changes to application code, software configurations, hardware configurations, security configurations, and computing resources progress through a system. A pipeline, in one embodiment, comprises a series of stages, and in each stage, various operations may be performed, such as compiling a particular set of code changes, deploying a particular computing environment, and/or running a series of verification tests to determine that the code changes have not adversely affected the functionality of software as it relates to the particular computing environment. Each stage, in an embodiment, is made up of a sequence of actions, which are tasks such as building code or deploying a particular set of computing resources to perform an approval workflow comprising a series of tests such as unit tests, build verification tests, build acceptance tests, integration tests, load tests, stress tests, and various other tools may be utilized to ensure high-quality computing products.

In an embodiment, a pipeline has multiple sequential stages such that changes to application code, software configurations, hardware configurations, security configurations, computing resources, etc. are compiled and built for one or more staging environments. The staging environments are provisioned, and tests (e.g., integration tests) are run and validated, and are deployed to a production environment. In an embodiment, a pipeline stage allows deployment targets of the same type (e.g. multiple Apollo environment stages) to be logically grouped together and approval workflows and promotions are applied at the stage level. For example, stages in a pipeline may correspond to a region (e.g., USA or EU) and logical state (e.g., pre-production, beta, production). In an embodiment, a pipeline is utilized so that only resources specific to a region and logical state (e.g., USA pre-production) are modified at each pipeline stage, thereby limiting the potential adverse impact (sometimes referred to as a "blast radius") of a bad configuration change. In an embodiment, the staging environment is an internal testing environment in which changes to application code, software configurations, hardware configurations, security configurations, etc. can be tested in a manner that does not affect a production environment that customers are exposed to—in this way, failures that are detected in the staging environment may be rolled back to ensure that customers are not exposed to changes that may adversely affect the customer experience and unnecessary crashes, performance issues, battery issues, connectivity issues, and other types of negative customer experiences may be avoided.

In an embodiment, each stage of the pipeline can be configured to specify various attributes to the environment particular to that stage—for example, application code, software configurations, hardware configurations, security configurations, computing resources etc. may be specified, as well as a particular set of tests to run at the particular stage of deployment. In an embodiment, a pipeline template package, such as a Live Pipeline Template (LPT) package, includes code for a specific template. In an embodiment, a configuration tool such as LPT Synthesis programmatically creates and configures resources that allows service teams to model their service and resource configurations as high-level abstractions in code and run LPT Synthesis to create and/or configure the resources as specified.

In an embodiment, an infrastructure-enabled pipeline is a pipeline that is used to orchestrate resource configuration changes (creating and updating resources) in addition to or in place of application code changes so that in an infrastructure-enabled pipeline, resource configuration changes and application code can be rolled out in the same pipeline. In an embodiment, an infrastructure-enabled pipeline includes capabilities for composite pipeline stages and fully automated resource configuration management. In an embodiment, an infrastructure-enabled pipeline supports one or more of the following capabilities: safely create and update resources configured as code; roll back bad resource configuration changes; build out new regions without manual intervention; generate deployment status of software and service resource; and prevent simultaneous software and resource configuration changes in the same region.

In an embodiment, a pipeline such as an infrastructure-enabled pipeline provides many features that provide value in the context of commercial software such as incremental rollout, testing, rollback, and deployment calendars, which are directly application to executing resource configuration changes. In some embodiments, pipelines also provide automation and a consistent, repeatable release process that improves reliability and consistency of commercial software, thereby reducing the chance of errors in production and improves visibility and auditing of changes to various aspects of deployment, such as the deployment of a particular set of computing resources to run application code. In an embodiment, an infrastructure-enabled pipeline is utilized to control the timing of production changes, ensuring that both infrastructure and application changes do not occur simultaneously, and that they can be applied (and rolled back) as an atomic change. In an embodiment, an atomic change may refer to a series of changes that are treated in an "all or nothing" manner such that if any step fails, the entire series of changes is rolled back and the environment is reverted to a state as if none of the steps prior to the atomic change occurred.

In an embodiment, an infrastructure-enabled pipeline is configured using LPT Synthesis to specify computing resource configurations for a pipeline. In some embodiments, a template package may specify both an application pipeline and an infrastructure pipeline. In an embodiment, application software and resource configurations are deployed independently (e.g., having separate application-only pipelines and infrastructure-only pipelines). In an embodiment, the infrastructure may refer to computing resources of a computing resource service provider such as virtual machine instances and storage systems, and may include additional parameters related to the computing environment such as specifying a user account or role that should be assumed.

In an embodiment, a deployment pipeline is managed using an inheritable and extensible source code template—generally referred to as a live pipeline template (LPT) that, as described in greater detail elsewhere, allows both enterprise customers and the computing resource service providers to define and manage deployment pipelines which, in turn, are used to launch, maintain, and update the services and systems used to host and provide computing services. In an embodiment, a pipeline template package (e.g., a LPT package) encapsulates a comprehensive model of a deployment pipeline and production configuration for a given type of application or service. Deployment pipelines built using a live pipeline template are sometimes referred to as a "continuous deployment pipeline," as changes to the application or service being deployed via such a pipeline may automatically propagate through pipeline stages towards a production deployment (or rolled back if errors or conflicts are detected).

In an embodiment, rather than develop a deployment process or strategy to deploy a new application or service from scratch (or to deploy an existing application or service to a new location), a developer specifies a small amount of information about the particular service or application in the source code of a pipeline template (e.g., a LPT package) and the information is then used to generate a new instance of that live pipeline template, customized using the source code specified by the developer. For example, the developer may specify high-level details about the application or service in the live pipeline template, such as a service name, administrative contact(s), and where the pipeline should (or should not) be deployed, such as a specific set of cloud computing regions offered by a cloud services provider. Importantly, modeling the deployment process for a given application or service type using a live pipeline template brings the configuration of the deployment pipeline under source code control. That is, instead of specifying a deployment process using change management orders or ad-hoc workflows, a deployment pipeline is specified using source code of a live pipeline template, which may then be localized by a developer for each instance of that live pipeline template.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In an embodiment, FIG. 1 illustrates a diagram 100 of an infrastructure-enabled pipeline that orchestrates resource configuration changes (creating and updating resources) in addition to or in place of application code changes so that in an infrastructure-enabled pipeline, resource configuration changes and application code can be rolled out in the same pipeline. In an embodiment, the diagram 100 illustrates a pipeline template package 102 (e.g., a LPT package) that includes source code which is compiled as part of a build 104 to generate a set of infrastructure templates 106A, 106B, and 106C that encodes in a human-readable format (e.g., JSON format) resources and configurations to be deployed as part of the particular stage, the templates are utilized to deploy infrastructure at various stages 108A, 108B, and 108C of a pipeline, and service code 110 is loaded to and executed from computer systems within the respective stages of the pipeline, which is rolled out in a controlled manner (e.g., sequentially) based at least in part on approval 112 gates along various stage of the development.

In an embodiment, a pipeline template package 102 is a file or document that includes source code or executable a resource configuration managed by a source code management system or a versioning control system that may, for example, keep a versioned history of files and determine the set of changes that were made between one version of a file to another. In an embodiment, the pipeline template package 102 is a Live Pipeline Template (LPT) package that specifies both service code (e.g., code that is executed as part of providing service-related functionality to clients) and infrastructure code (e.g., code that specifies how resources and infrastructure for running application code should be configured). In an embodiment, changes to a pipeline template package (e.g., a LPT package) made by an engineer are code reviewed and approved by other engineers and quality assurance experts within an engineering team, and the change are committed to a source code repository that supports version control, the infrastructure-enabled pipeline triggers a build 104 of the pipeline template package (e.g., a LPT package) to generate an application definition document in a machine readable format. In an embodiment, the build 104 is automatically triggered (e.g., a build is programmatically triggered without requiring additional steps by the engineer to explicitly run a build command from a command line interface) by the change to the pipeline template package. The build 104 may be performed by any suitable computing entity, such as a compiler that is able to generate machine readable executable code from source code of the pipeline template package 102. A build 104, in an embodiment, is hardware, software, or a combination thereof, that includes instructions to perform a build process which includes compiling, interpreting, assembling, etc., the pipeline template package 102 or a portion thereof. In an embodiment, an application definition document is a generic document model generated from a pipeline template package (e.g., a LPT package) describing the entire service resource configuration in a human-readable format such as JavaScript Object Notation (JSON), Extensible Markup Language (XML), or, more generally, any structured markup language—this template may be generated by LPT Synthesis during build time, and may be used as an intermediate format to call downstream services to configure resources. In an embodiment, an application definition is encoded in a machine readable interchange format that describes how to provision and deploy stages of a pipeline—for example, to a beta stage, then to a pre-production stage, then to a first production region, then to one or more additional production regions, and so on.

In an embodiment, the build 104 phase generates infrastructure templates 106A, 106B, and 106C which are documents that include data of custom resources which are normally handled by synthesis drivers (e.g., LPT Synthesis drivers) for resources that are not hosted and/or not supported by a computing resource service provider as well as data for resources that are normally hosted by a computing resource service provider. In an embodiment, each computing resource has a corresponding custom resource entry in the template so that a change set created for the template includes entries for each resource (as opposed to, for example, a single custom resource entry for all template resources in the partition). In an embodiment, specifying custom resources in this manner allows for finely-grained resource failures such that pipeline templates are able to make partial progress on the total set of resources requested at a given pipeline stage even when, for example, less than all of the computing resources needed during an early region build are available, perhaps due to the region build order. In an embodiment, the resources and service code to be deployed at various stages of a pipeline may differ. In an embodiment, a pipeline has multiple sequential stages such that a change to the infrastructure and/or service code (e.g., in a LPT package) is first deployed to a beta environment in which the changes are verified using series of tests such as unit tests, build verification tests, build acceptance tests, integration tests, load tests, stress tests, and various other tools may be utilized to ensure the change is of a high-quality quality and does not adversely affect the customer and/or end-user experience. Contingent upon passing any quality metrics or gates run in the beta environment, there may be a subsequent pre-production stage in which the same or different tests may be run in configuration that is the same or different from that of the beta stage, and contingent upon those tests passing, the changes may be deployed first to a single production environment (e.g., a single region or availability zone), and then to additional production environments thereafter. In an embodiment, manual approval 112 gates may exist between stages in which engineers, management, executives, or others entities involved in the deployment of software and infrastructure are required to sign off on the changes before they propagate down the pipeline, which may include reviewing test results on a graphical user interface and manually approving the test results by selecting, via a graphical user interface, whether to allow the deployment to continue to the next stage of the pipeline.

In an embodiment, an infrastructure template can be processed by a target execution environment to update the configuration of the target execution environment. The configuration may involve any infrastructure-level configuration, where the infrastructure itself is instantiable, modifiable, and/or definable by machine readable executable code. In an embodiment, an infrastructure template, when processed by an entity associated with the target execution environment, updates operational parameters of virtualized devices associated with the target execution environment to an equivalent state associated with the monitored development environment changes from which the infrastructure template was generated.

In an embodiment, FIG. 1 illustrates a diagram in which the configuration of infrastructure resources in various stages 108A, 108B, and 108C of a pipeline differ—as an example, the same service code 110 is deployed to each stage 108A, 108B, and 108C, but the resources and configuration of resources are different between at least some of the stages, such as in the manner illustrated in FIG. 1. Continuing with the example, the beta stage may be a first and/or early stage of the development in which changes to a LPT package are tested, and may include various resources—the beta stage 108A of FIG. 1 illustrates a computing system (e.g., a virtual machine instance) and two storage system configured to communicate with each other, which may serve as the foundational resources that are used to run tests in an environment.

In an embodiment, the stages 108A, 108B, and 108C illustrate various stages of an infrastructure-enabled pipeline, which include additional stages not illustrated in FIG. 1. In an embodiment, an infrastructure-enabled pipeline includes capabilities for composite pipeline stages and fully automated resource configuration management. In an embodiment, composite pipeline stages support application and resource configuration changes to be rolled out as a single revisionable unit, and automatic invocation of LPT Synthesis provides fully automated resource configuration management. In an embodiment, a composite stage is a new modeling primitive that enables the grouping for deployment targets and allows the targets to be deployed with preference rules specified by customers. Composite stages are used to create pipelines in which both resource configuration and application changes can deployed and may coordinate multiple subordinate targets. In an embodiment, a composite stage is used to create pipelines in which both resource configuration and application changes can deploy.

In an embodiment, an infrastructure-enabled pipeline supports one or more of the following capabilities: safely create and update resources configured as code; roll back bad resource configuration changes; build out new regions without manual intervention; generate deployment status of software and service resource; and prevent simultaneous software and resource configuration changes in the same region.

In an embodiment, infrastructure-enabled pipelines support resource management which may include the management of global resources as described below. In an embodiment, an infrastructure-enabled pipeline is utilized to incrementally roll out resource configuration changes across multiple stages of a pipeline. In an embodiment, resources are incrementally rolled out by using LPT Synthesis to ensure that only resources related to a particular region and logical stage associated with a pipeline stage are modified, thereby limiting the potential adverse impact or blast radius of a bad configuration change. In an embodiment, a resource configuration is changed by an engineer for a service by changing a configuration for a service specified in the service's corresponding pipeline template package (e.g., a LPT package), the change may be code reviewed and approved by other engineers and quality assurance experts within an engineering team, and the change may be committed to a source code repository that supports version control, the infrastructure-enabled pipeline may trigger a build of the pipeline template package (e.g., a LPT package) generate a new application definition document in which each resource is annotated in a machine readable format with its application region and logical stage information, and the change may flow through the infrastructure-enabled pipeline through multiple stages of the pipeline—for example, to a beta stage, then to a pre-production stage, then to a first production region, then to one or more other production regions, and so on.

In an embodiment, there exists dependencies between resources—for example, if resource type A depends on resource type B, it may be the case that, in the context of LPT Synthesis, that resource type A can only be synthesized once resource type B exists. In an embodiment, an infrastructure-enabled pipeline is configured to manage dependencies between resources which are global (e.g., not specific to any pipeline stage) or partitioned—accordingly, various types of dependencies may exist and may be handled by the infrastructure-enabled pipeline differently, including partitioned resources dependent on other partitioned resources, partitioned resources dependent on global resources, global resources dependent on global resources, and global resource dependent on partitioned resources. In an embodiment, an infrastructure-enabled pipeline supports a mechanism for declaring dependencies between different types of resources. In some cases, multiple stages share a resource (e.g., a box and fleet stage in the same region may share resource with beta and production stages) and a create operation is executed in the earliest stage while an update operation is executed in the last stage.

In an embodiment, global resources are created and updated in a dedicated stage at the beginning of an infrastructure-enabled pipeline. Global resources refer to resources that may be utilized across multiple stages of a pipeline, and may include, for example, top-level host-classes and Apollo environments. In an embodiment, an infrastructure-enabled pipeline is, itself, a global resource, and is managed via a meta-pipeline. In an embodiment, the meta-pipeline conforms to design principles and obviates the need for an infrastructure-enabled pipeline to modify itself. In an embodiment, a meta-pipeline is created using a first pipeline template package (e.g., a LPT package) separate from a second pipeline template of an infrastructure-enabled pipeline and can be executed from a command line interface to bootstrap the automation process. An embodiment of an infrastructure-enabled pipeline and a meta-pipeline setup is described in more detail, for example, in connection with FIG. 2.

In an embodiment, a pipeline template package 102 (e.g., a LPT package) may specify one or more configurations of computing resources to be deployed at various stages of an infrastructure-enabled pipeline. In an embodiment, computing resource configurations (e.g., those specified in a LPT package) are validated using an approval workflow comprising workflows such as unit tests, build verification tests, build acceptance tests, integration tests, load tests, stress tests, and various other tools to ensure the delivery of high-quality computing-based products and services. In an embodiment, one or more of these tests may serve as gates such that, if the one or more tests do not pass or do not pass at a sufficient rate that the validation fails, the next stage of the pipeline is not deployed, a report is generated with the reason or reasons for failure, require a manual approval to override the failure, and more. In some cases, it may not be required for all tests to pass—for example, a suite of unit tests may include hundreds or even thousands of tests, such that the suite passes at a threshold level of 98% or higher. Generally speaking, a pass rate may be determined to be any passage rate that is acceptable in terms of code quality which may eventually be deployed to a production environment.

In an embodiment, a pipeline template package 102 (e.g., a LPT package) may specify one or more configurations of computing resources to be deployed at various stages of an infrastructure-enabled pipeline. In an embodiment, computing resource configurations (e.g., those specified in a LPT package) can be rolled back, such as in response to detecting that one or more tests at a particular stage of the infrastructure-enabled pipeline have failed. In an embodiment, some changes should not be rolled back, and service teams can provide a custom stack policy that prevents destructive updates on a per resource basis.

In an embodiment, an infrastructure-enabled pipeline manages controlled roll out of changes to infrastructure resources. In an embodiment, infrastructure-enabled pipelines are automatically disabled if they are rolled out to too many regions and too many stages within too short of a time—the threshold duration may be customized. In an embodiment, an infrastructure-enabled pipeline is disabled if it is rolled out to more than a single region in the first production stage—thereby ensuring that if there are any adverse effects of changes to infrastructure and/or code, that the potential adverse impact or blast radius of the bad configuration change is limited to a single production stage.

For example, an infrastructure template 106A for a Beta Stage 108A may be utilized as part of an internal beta testing phase of a pipeline that involves running a set of tests 112A to verify functionality of a service utilizing various resource such as virtual machines and storage to fulfill requests—accordingly, the infrastructure template 106A may be utilized to deploy infrastructure such as virtual machine instances and storage systems in a specified configuration, service code 110 may be deployed onto the infrastructure, and a set of tests may be run within the beta environment. In an embodiment, the test (such as the tests 112A, 112B, and 112C shown in FIG. 1) includes machine readable executable code that, when executed by one or more processors, performs one or more tests that generate a result (e.g., a passing result, a failing result, a re-run result, an indeterminate result, a timed-out result, and more). In an embodiment, a test such as the test 112A shown in FIG. 1 includes software, hardware, or a combination thereof. Continuing with the example, a PreProd Stage 108B (preproduction) may be deployed based on a PreProd infrastructure template 106B (preproduction infrastructure template) and may, furthermore, specify a configuration that is different from those specified in the beta stage—as an example, service code 110 running on a virtual machine instance provisioned in the preprod stage may utilize resources that are configurable to be deployed across data centers in a distributed manner (e.g., storage systems may be distributed across data centers in different geolocations) and may furthermore require security credentials to issue requests and fulfill requests for resources in different data centers (e.g., cross-center communications may be encrypted under a cryptographically protected communications session such as Transport Layer Security (TLS) and/or may require a valid access token for requests to be fulfilled). Accordingly, the tests 112B in the PreProd Stage 108B may be different from the tests 112A in other stages based on the infrastructure configuration—as an example, the PreProd Stage 108B may include security tests, such as performing a set of operations in that provide sufficient security credentials and verifying that requests are fulfilled and also testing the negative case in which insufficient security credentials (e.g., a guest account) are utilized and verify that requests are not fulfilled based on those requests. Generally speaking, the tests 112A, 112B, and 112C may be specified in the pipeline template package 102 and may be different from stage to stage. Likewise, the resources and/or configuration of resources may be different in other stages—FIG. 1 further illustrates that the Prod (production) infrastructure template 106C may configure and deploy additional resources such as a load balancer (denoted as "LB" in FIG. 1) where a storage system is replaced by a fleet of storage systems behind a load balancer that routes storage-related commands to various storage systems of the fleet based on availability.

Figure 2:
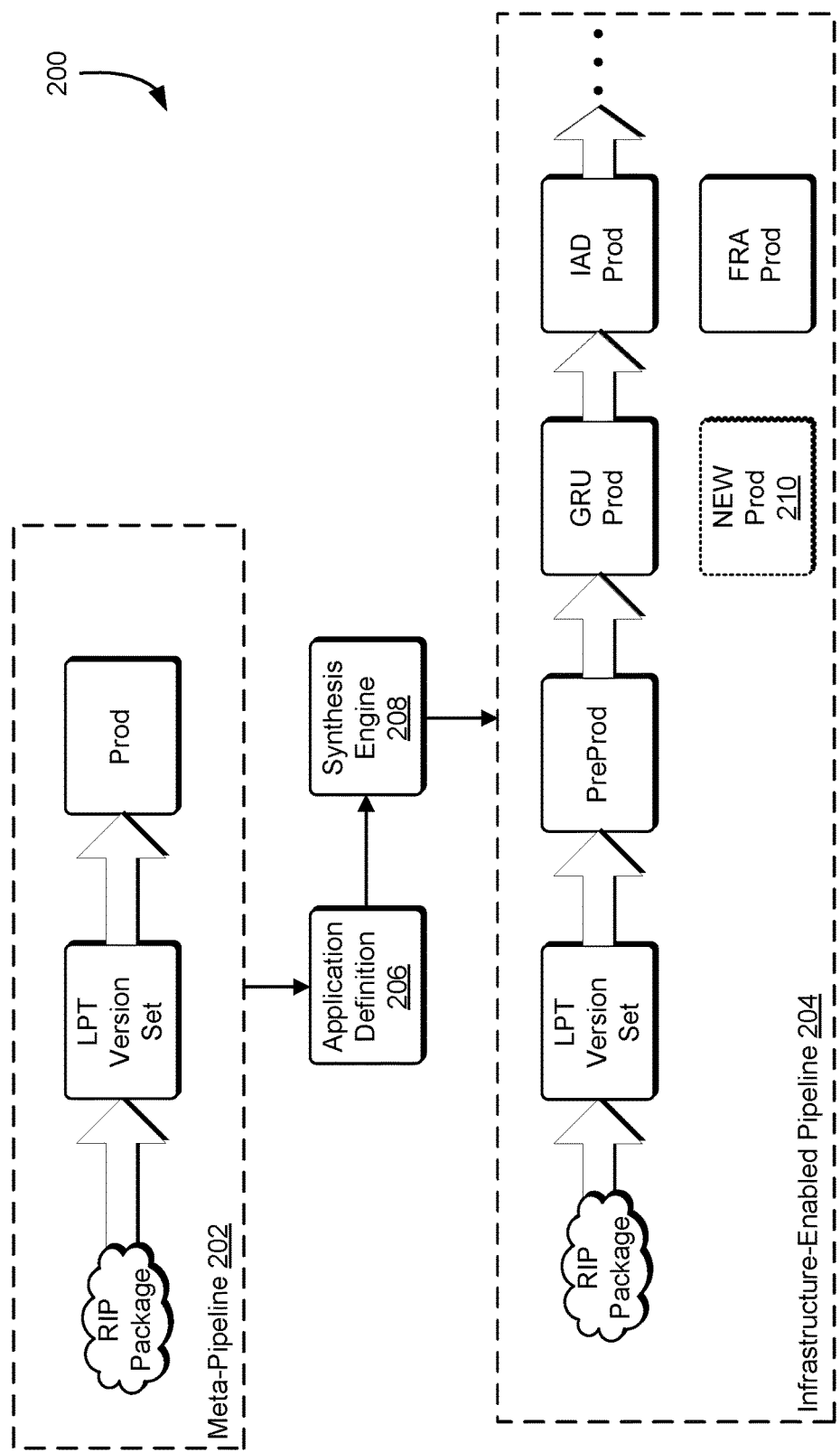
FIG. 2 illustrates a diagram in which a composite pipeline is utilized to perform an automated process for deploying a build for a new region.

In an embodiment, FIG. 2 illustrates a diagram 200 in which an infrastructure-enabled pipeline 204 is utilized to perform an automated process for deploying a build for a new region. In an embodiment, LPT Synthesis depends on a regional information package 206 for region data. In an embodiment, the region information package is a RIP (Region Information Provider) Brazil package that vends region and service configuration information and enables the programmatic discovery of both service endpoints and region build status data. In an embodiment, a region information provider may have a standard set of configuration values at the beginning of a new region build, and service teams may update region information provider with service-specific information such as build status. In an embodiment, when a new region is added to a region information package (e.g., a RIP Brazil package), a build of the template package (e.g., LPT package) is triggered, a new application definition document 206 is created at build time in a machine readable format and includes the new pipelines stage corresponding to the new region and all resources needed for deployment of the new region are specified. In an embodiment, the change (e.g., addition of a new region 210) is propagated through both a meta-pipeline 202 and the corresponding infrastructure-enabled pipeline 204, and the new stage in the infrastructure-enabled pipeline in turn triggers the provisioning of new computing resources in that region, and deploys application software once hosts become available. In an embodiment, the region information provider package (e.g., RIP Brazil package) vends region and service configuration information and enables the programmatic discovery of both service endpoints and region build status data. The Region Build Team adds a standard set of configuration values in region information provider at the beginning of a new region build, and service teams update region information provider with service-specific information such as build status.

In an embodiment, a meta-pipeline 202 is a pipeline which is able to modify another pipeline—for example, the meta-pipeline 202 shown in FIG. 2 is configured to modify the infrastructure-enabled pipeline 204. A meta-pipeline 202 may invoke a synthesis process (e.g., LPT Synthesis) that allows for programmatic creation and configuration of resources based on high-level abstractions in code that are created by engineers. In an embodiment, an infrastructure-enabled pipeline 204 refers to a pipeline to roll out resource configuration changes and application code in the same pipeline. In an embodiment, an infrastructure-enabled pipeline includes capabilities for composite pipeline stages which allow application and resource configuration changes to be rolled out as a single, revisionable unit and further include capabilities for automated invocation of LPT Synthesis from pipelines, which provides fully automated resource configuration management. An infrastructure-enabled pipeline may make use of composite stages to group deployment targets and allows the targets to be deployed with user-definable preference rules. A composite stage may coordinate multiple subordinate targets. Composite stages are used to create pipelines in which both resource configuration and application changes can deploy. In an embodiment, the infrastructure-enabled pipeline 204 is configured using a synthesis process such as LPT Synthesis.

Figure 6:
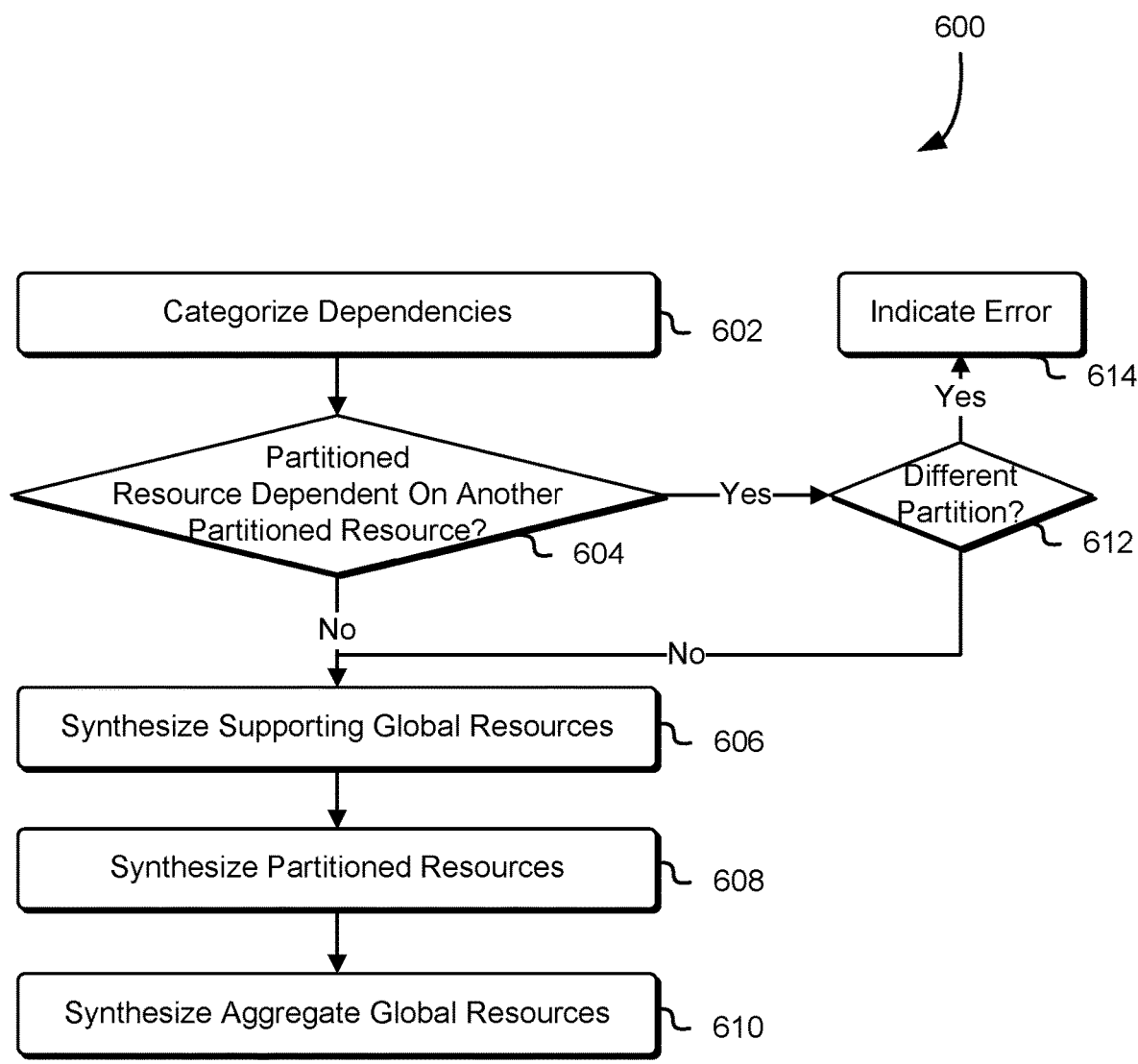
FIG. 6 illustrates process for managing the provisioning (e.g., synthesis) of global and partitioned resources.

In an embodiment, the build step of a pipeline template package (e.g., a LPT package) generates an application definition file 206 describing the entire service resource configuration in a human-readable format such as JavaScript Object Notation (JSON), Extensible Markup Language (XML), or, more generally, any structured markup language. In an embodiment, the template is generated using a synthesis engine 208 performing a synthesis process (e.g., LPT Synthesis) during build time, and is used as an intermediate format to call downstream services to configure resources. In an embodiment, synthesis processes such as those described in connection with FIG. 6 are utilized. Downstream resources may include, for example, a deployment engine that is configured or configurable to deploy a specified set of software across a target fleet of hosts. In an embodiment, the application definition file 206 tags resources with their originating dimensions and stages and changed dimensions and stages such that synthesis can be invoked for a subset of a specific region's resources which have changed. In an embodiment, the build phase also generates infrastructure template documents, which are documents that include data of custom resources which are normally handled by synthesis drivers (e.g., LPT Synthesis drivers) for resources that are not hosted and/or not supported by a computing resource service provider.

Figure 3:
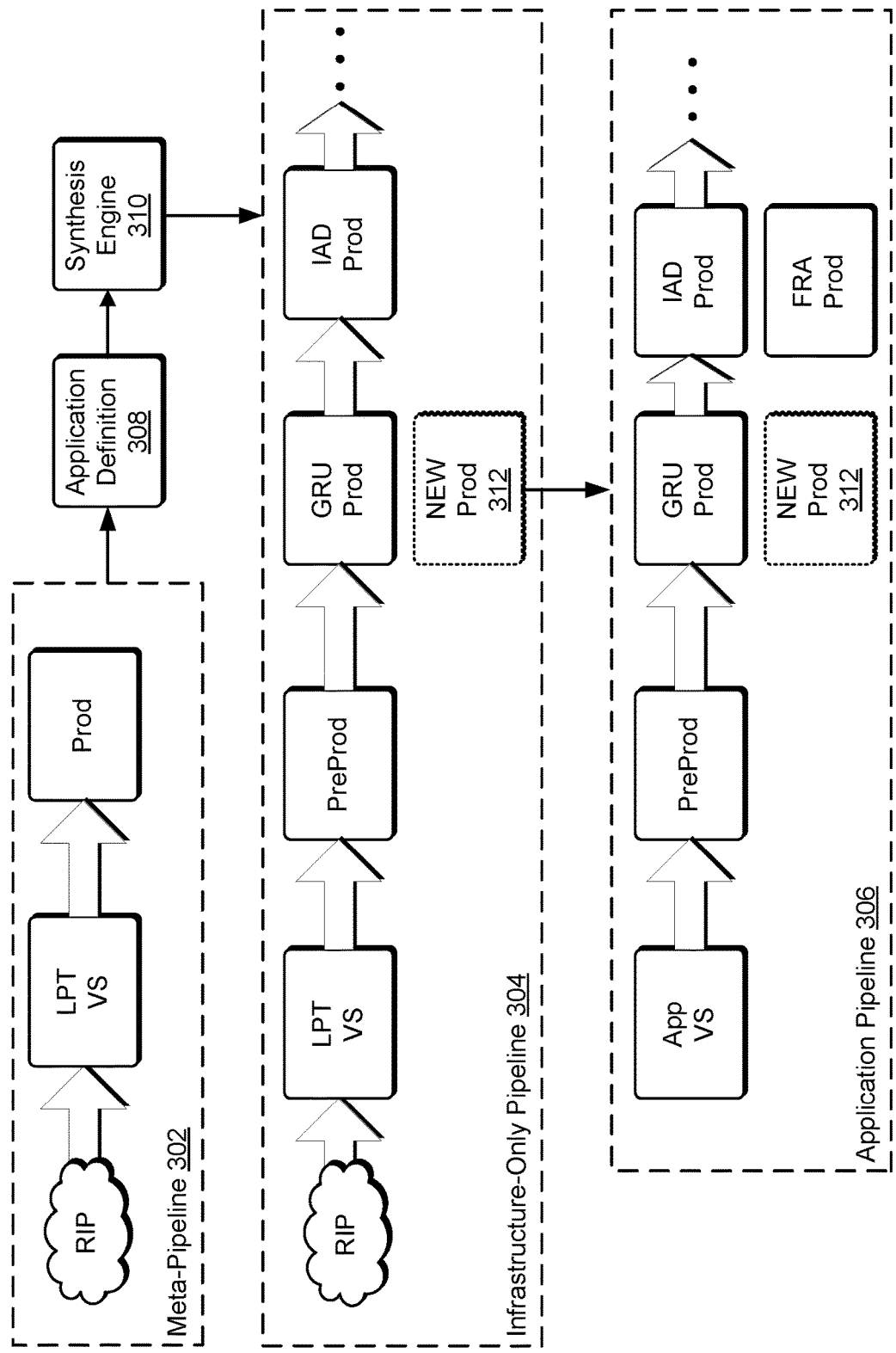
FIG. 3 illustrates a diagram in which an infrastructure-only pipeline and application pipeline are utilized to perform an automated process for deploying a build for a new region.

In an embodiment, FIG. 3 illustrates a diagram 300 in which an infrastructure-only pipeline 304 and application pipeline 306 are utilized to perform an automated process for deploying a build for a new region. In an embodiment, deployment of a build for a new region are performed where separate infrastructure-only 304 and application pipelines 306 are used. In an embodiment, an application definition 308 document is created at build time and includes a new pipeline stage (e.g., the pipeline stage corresponding to a new region 312 that was created) and all computing resources specified for the service in the new region. In an embodiment, the build step of a pipeline template package (e.g., a LPT package) generates an application definition file 308 describing the entire service resource configuration in a human-readable format such as JavaScript Object Notation (JSON) format. In an embodiment, the template is generated using a synthesis engine 310 performing a synthesis process (e.g., LPT Synthesis) during build time, and is used as an intermediate format to call downstream services to configure resources. In an embodiment, synthesis processes such as those described in connection with FIG. 6 are utilized. In an embodiment, the change flows through both a meta-pipeline 302 and a corresponding infrastructure-only pipeline 304. In an embodiment, the new stage triggers the infrastructure-only pipeline to create new resources in that region and also creates a new stage in a corresponding application pipeline 306 and the application pipeline will deploy the application software once hosts become available. In an embodiment, an application pipeline is a pipeline used to orchestrate software deployments.

In an embodiment, such as those described in connection with FIGS. 2 and 3, an infrastructure-enabled pipeline is configured to handle scenarios in which certain resources are not available at the start of a region build. In an embodiment, for each pipeline execution, an infrastructure-enabled pipeline will only attempt to create resources that have been declared in a region information package (e.g., a RIP Brazil package), and are therefore expected to succeed. With the exception of explicit resource dependencies, an infrastructure-enabled pipeline will attempt to create all resources, rather than stop after the first failure. In an embodiment, logs including information indicating which resources succeeded and failed to be provisioned will be generated, and resources that are not yet available for creation are marked as failed for this purpose, and the entire deployment will fail until all resources have been created successfully—accordingly, terminating the deployment in this manner may prevent a potentially bad configuration (e.g., for a resource that does not exist in a region being built, but may exist in regions further along in the pipeline), from being erroneously promoted to the next pipeline stage. In an embodiment, an infrastructure-enabled pipeline is triggered when changes are detected, such as when a team creates a new pipeline package (e.g., a LPT package) or when a region information package configuration changes.

In an embodiment, such as those described in connection with FIGS. 2 and 3, it is possible to tie region build tasks to build phases and/or associated milestones. In an embodiment, a region information package's build phases can be configured with specific milestones to control the packages that are synthesized (e.g., by LPT Synthesis) as region build progresses. In an embodiment, an engineering team can model their region in multiple build-out phases and, elsewhere in the package, code may indicate, based on the region phase, places that the region early or late in the pipeline, add integration tests, monitors to track the incidence of high-severity bugs and crashes, etc. that are specific to those respective phases.

In an embodiment an infrastructure-enabled pipeline is configured to have regions built in the first production stage so as to prevent regions being built from blocking a pipeline. In an embodiment, the first production stage includes a first general availability (GA) region that promotes to the rest of the pipeline, as well as the regions being built with no promotions—examples of such embodiments are described elsewhere, such as in connection with FIG. 2. Once the build-out to a new region is complete, the corresponding stage can be repositioned to its final place in the pipeline. In an embodiment, the rearrangement can be performed automatically when the infrastructure pipeline updates the application pipeline. Promotions to/from this stage can be configured in the pipeline template package (e.g., a LPT package).

Figure 4:
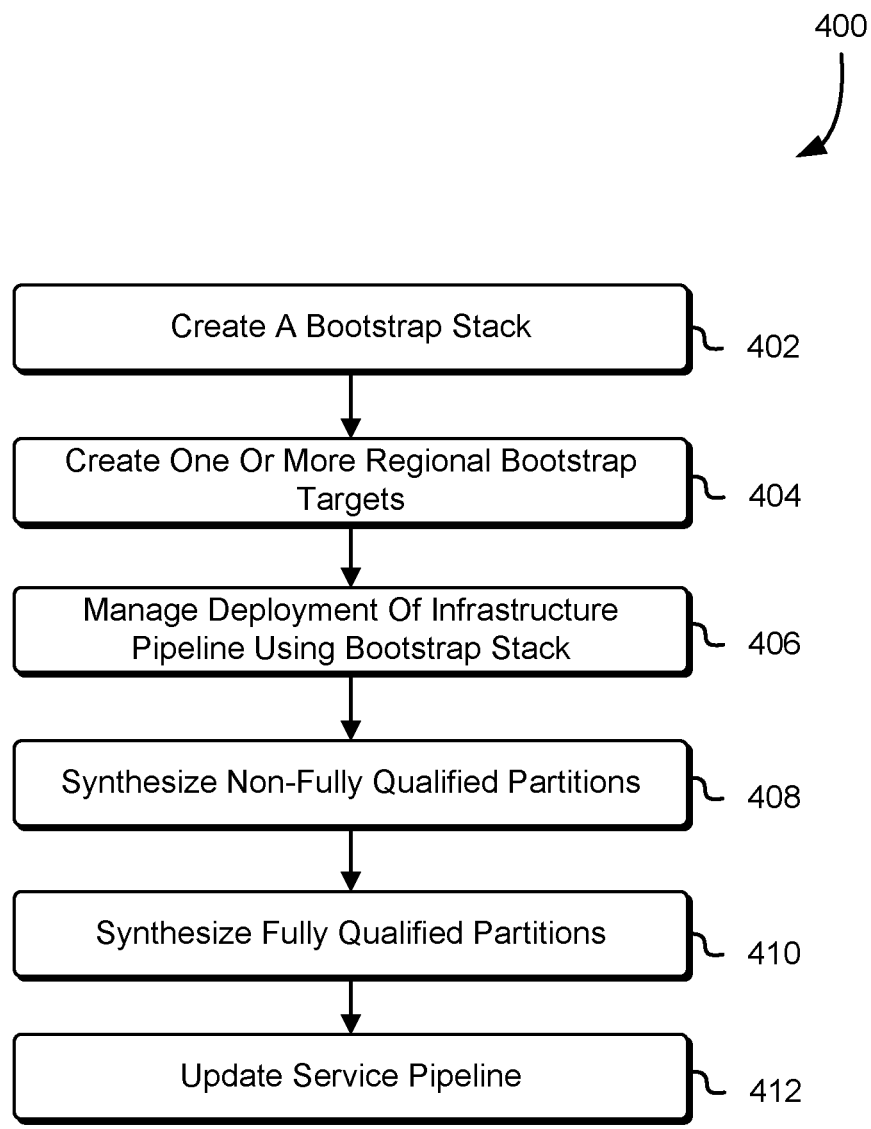
FIG. 4 illustrates a bootstrap process for creating an infrastructure pipeline.

In an embodiment, FIG. 4 shows an illustrative example of a process 400 for creating an infrastructure pipeline through a bootstrap process. The process 600 may be performed by any suitable entity using hardware, software, or a combination thereof, such as at least some of the entities described in connection with FIGS. 1-3. In an embodiment, the process 400 may involve running a command from a command line interface that queries the configuration of an infrastructure template (e.g., those described elsewhere) and creates 402 a bootstrap stack with its corresponding template. In an embodiment, this process may include invoking a bootstrapping routine via a command line interface, creating a bootstrap stack, creating scaffold and infrastructure stacks for the pipeline, and creating the infrastructure pipeline with all of the infrastructure stacks in its structure. In an embodiment, each infrastructure stack will then be updated as the template promotes through the pipeline. More generally, a bootstrap stack may be the computing resources and code responsible for creating the resources necessary for a region's resources to be managed by the infrastructure pipeline. In an embodiment, a bootstrap stack may include a regional computing resource service provider account, a scaffold stack, and a role assumed to create the scaffold and infrastructure stacks. In an embodiment, the synthesis engine 508 assumes a role in the manner described in connection with FIG. 7.

In an embodiment, one or more regional bootstrap targets are created 404. In an embodiment, the regional bootstrap stages are responsible for creating the following resources for a new region, a user account, an empty infrastructure stack, and the scaffold infrastructure stack used to add the infrastructure stack to the pipeline. In an embodiment, a scaffold stack refers to a particular type of infrastructure stack that includes resources necessary to place an infrastructure stack into a pipeline, and may, for example, include a role that may be assumed in order to deploy an infrastructure pipeline to a particular region.

In an embodiment, the deployment of infrastructure is managed 406 during in infrastructure pipeline management stage. In an embodiment, an infrastructure pipeline may support self-modification or self-managing (e.g., support automatically adding a new region to a pipeline). In an embodiment, a best practice of a computing resource service provider is to have a separate user account for each region, meaning that the infrastructure stack used for each region in the infrastructure pipeline must be associated with an entity or account with sufficient privileges, such as the owner of the user account for each region. In an embodiment, an infrastructure stack is generated from a template that encodes the resources which should be used to run an application and may include resources that are natively supported by a computing resource service provider as well as custom resources. As an example, a template may encode (e.g., in a JSON file) a virtual machine instance and an access policy for a customer account, and an infrastructure stack may create the resources in a customer account and initialize a virtual machine instance. In an embodiment, when a new region is added, the infrastructure pipeline may create a new account for the region, create an infrastructure stack in the newly created account, and put the region's infrastructure stack into the pipeline. In an embodiment, LPT supports creating user accounts for a computing resource service provider, which is a custom resource similar to others in infrastructure pipelines. In an embodiment, configuration data of infrastructure pipelines uses placeholders to support assuming a role of a computing resource service provider.

In an embodiment, non-fully qualified partitions are synthesized 408 before any fully qualified partitions that depend on them are synthesized. In an embodiment, an infrastructure stack is created for each partition, which may use an application definition encoded in a file (e.g., a JSON file). In an embodiment, a fully qualified partition refers to a partition that has both a dimension and logical state. In an embodiment, the infrastructure pipeline covers every step in partitioned synthesis and some targets may not be fully qualified. In an embodiment, fully qualified partitions are synthesized 410 after all non-fully qualified partitions are synthesized.

In an embodiment, after all partition stages (i.e., all non-fully qualified and fully qualified partitions) are synthesized, a service or application pipeline are updated 412. In an embodiment, an infrastructure pipeline's application maps in a one-to-one mapping to a bootstrap infrastructure stack template that is used by the bootstrap stage in the pipeline, and the service pipeline's application definition maps in a one-to-many mapping to two or more infrastructure templates where templates are created for each partition.

In an embodiment, a pipeline template package (e.g., a LPT package) is built and generates a flat application definition. In an embodiment, an application definition document is a generic document model generated from an LPT package describing the entire service resource configuration in a human-readable format such as JavaScript Object Notation (JSON) format. In an embodiment, an application definition JSON file annotates each computing resource with its applicable dimension, stage, and sub-environment that represents the desired steady-state of the service's resources. In an embodiment, the building of the pipeline template package (e.g., a LPT package) is performed in a sandboxed fleet and does not necessarily require network access.

In an embodiment, the pipeline templates' drivers support various types of resources, including builder tools, credential and account management, and computing resources such as virtual machines, network storage, and more. In an embodiment, a pipeline template package (e.g., a LPT package) is rolled out through an infrastructure pipeline or, more generally, a pipeline that is capable of rolling out both infrastructure and application code alongside one another. In an embodiment, an infrastructure pipeline has an identical structure to an application pipeline, in which case the same template package (e.g., LPT package) is used to generate both configurations. In an embodiment, changes to a template or its dependencies (e.g., new region information made available via a region information provider) triggers a build and/or merge in a pipeline, and a new revision of the template will begin a rollout such that, as the template makes its way through each of the pipeline's stages, targeted synthesis for a specific dimension, stage, and/or sub-environment is executed. In an embodiment, after synthesis takes place, the pipeline can make use of manual approvals, tests, and more for approving the new revision of the template, and all of the same pipeline tooling used for service code can also be applied to infrastructure template code, including rollbacks, versioning, and change tracking.

In an embodiment, a change to template code (e.g., for a LPT package) or change to dependencies (e.g., region information provider data) trigger an automatic build and/or automatic merge of the change into an infrastructure pipeline's version set in the same manner as code changes to application code. In an embodiment, the rebuild generates an infrastructure template for each stage in the pipeline as part of the build output. In an embodiment, the change flows through the pipeline in accordance with blockers and approvals. Each stage of the pipeline may signify a particular scope for resource changes (e.g., resources related to a particular region or a feature and the updated infrastructure templates for a stage are executed to an infrastructure management service, which may send some or all resource work to a pipeline template synthesis worker. These resources may be resources that are not hosted by a computing resource service provider and, accordingly, are to be synthesized.

In an embodiment, an infrastructure pipeline diagram is shown in FIG. 2. In an embodiment, an automatic merge process may include merging packages that could include new region data (e.g., from region information provider data) which, in turn, generates new regions from the template. In an embodiment, this could also include broader templates where an engineering team rolls out an infrastructure change applicable to many different services. In an embodiment, the template describes infrastructure for the service pipeline, the skeleton of which is identical for the LPT infrastructure pipeline shown in FIG. 2.

In an embodiment the pipeline stage 210 is the first infrastructure stage that manages the infrastructure pipeline itself, adding additional supporting infrastructure stages to match any new stages being added to the matching service pipeline (e.g., based on region information package data). In an embodiment, each stage has multiple infrastructure templates so as to configure resources that are regionalized, configured globally, configured high side, or configured low side.

In an embodiment, the build step of a pipeline template package (e.g., a LPT package) generates an application definition file. In an embodiment, an application definition document or a template is a generic document model generated from an LPT package describing the entire service resource configuration in a human-readable format such as JavaScript Object Notation (JSON) format. In an embodiment, the template is generated by LPT Synthesis during build time, and is used as an intermediate format to call downstream services to configure resources. Downstream resources may include, for example, a deployment engine such as Apollo that is configured or configurable to deploy a specified set of software across a target fleet of hosts. A deployment target may refer to a deployment type (e.g., environment stage, deployment group, infrastructure stack). In an embodiment, the application definition file tags resources with their originating dimensions and stages and changed dimensions and stages such that synthesis can be invoked for a subset of a specific region's resources which have changed. In an embodiment, the build phase also generates infrastructure template documents, which are documents that include data of custom resources which are normally handled by synthesis drivers (e.g., LPT Synthesis drivers) for resources that are not hosted and/or not supported by a computing resource service provider. In an embodiment, each computing resource has a corresponding custom resource entry in the template so that a change set created for the template includes entries for each resource (as opposed to, for example, a single custom resource entry for all template resources in the partition). In an embodiment, specifying custom resources in this manner allows for finely-grained resource failures such that pipeline templates are able to make partial progress on the total set of resources requested at a given pipeline stage even when, for example, less than all of the computing resources needed during an early region build are available, perhaps due to the region build order.

In an embodiment, resource vendors (e.g., LPT) register a custom name and handler via a service call to an infrastructure management service and templates (e.g., other templates) can reference the resource by name, and the infrastructure management service routes the reference to a registered handler. In an embodiment, the customer resource has one or more properties, including: a JSON blob of a pipeline template's serialized application definition entry for a given resource that a synthesis engine (e.g., LPT synthesis worker) deserializes into a domain object (e.g., LPT domain object) that it is able to synthesize with its existing drivers. In an embodiment, the resource's originating pipeline name is also included as a property (e.g., in JSON format) and is utilized in processes for routing, auditing, logging, request tracing, and more. In an embodiment, an infrastructure management service creates each pipeline template resource on an individual basis (rather than invoking the pipeline template on an entire service stack) and utilizes custom resource entries defining resource dependencies to order resource creation during a change set execution.

In an embodiment, an infrastructure pipeline is derived or derivable from an application pipeline (e.g., the application template that the infrastructure template configures resources for). In an embodiment, an infrastructure template is generated from an application template. In an embodiment, infrastructure and application changes flow through the pipeline according to similar or the same release schedules, although it is not necessary that such changes be synchronized between infrastructure and application changes. In an embodiment, an infrastructure pipeline may include additional stages such as the addition of a BATS stage and one or more additional changes to configure global resources (e.g., the pipeline itself).

In an embodiment, a pipeline's normal deployment target is replaced with infrastructure stacks for configuring resources related to the deployment target, such as a "Beta" stage in the service pipeline that deploys to a Beta environment that corresponds to a "Beta" stage in the infrastructure pipeline with infrastructure stacks configuring resources needed by the environment. In an embodiment, making resource changes to the infrastructure pipeline presents multiple different approaches—for example, it could be configured through a separate pipeline in the manner in which a meta-pipeline is configured, but built on top of a meta-pipeline, thereby creating a meta-pipeline for a meta-pipeline (i.e., a meta-meta-pipeline), or, as a second example, be configured as an early stage in the infrastructure pipeline (e.g., as a self-modification or self-management where an infrastructure pipeline configures itself). In an embodiment, a resource at a pipeline stage is configured through different types of end points such as resources with global endpoints, resources for airgapped region configured on the low side, and resources configured with regional endpoints. In an embodiment, these different types of end points are accounted for by multiple distinct infrastructure template documents being generated for a single pipeline stage, so that infrastructure stacks to cover all fabrics for a partition's resources can be created.

Figure 5:
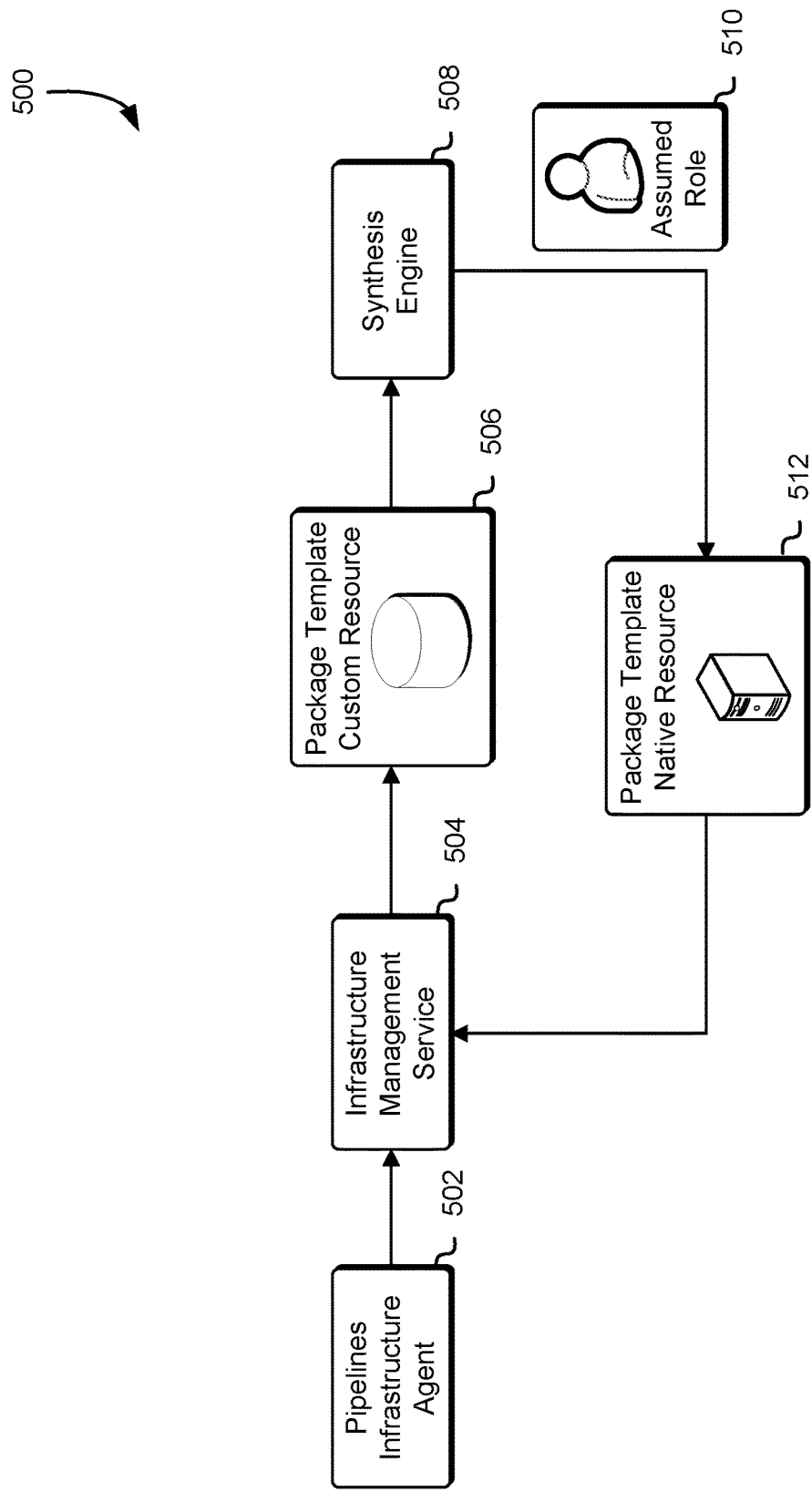
FIG. 5 illustrates a diagram in which a pipelines infrastructure agent is used to prepare and execute infrastructure change sets.

In an embodiment, FIG. 5 illustrates a diagram 500 in which a pipelines infrastructure agent 502 is used to prepare and execute infrastructure change sets. In an embodiment, a pipelines infrastructure agent 502 is a software component that includes a set of executable instructions that, if executed by one or more processors, prepares and executes infrastructure change sets. In an embodiment, a packaging stage at the beginning of the pipeline is used for the initial upload of artifacts (e.g., infrastructure template documents) to a storage service, and is invoked by Pipelines to perform a replication process that copies the artifacts from region-to-region. Each deployment target in the infrastructure pipeline may be automatically mapped to a corresponding infrastructure template including that particular pipeline stage's partitioned resources. In an embodiment, the agent is also responsible for facilitating other Pipelines features, such as change tracking and rolling back changes for any reason (e.g., deployment failures).

In an embodiment, LPT is able to utilize self-service resource support to configure custom resources (e.g., resources not natively supported by a computing resource service provider). In an embodiment, an infrastructure management service 504 is a software component that includes a set of executable instruction that, if executed by one or more processors, signals LPT by sending a notification (e.g., via a notification service that pushes or delivers messages to subscribers of the service) to create/update/delete a resource. In an embodiment, an infrastructure management service 504 is a service of a computing resource service provider that clients of the infrastructure management service 504 (e.g., clients of the computing resource service provider, other services of the computing resource service provider) access via a set of defined application programming interface (API) requests. A synthesis engine 508, in an embodiment, is a software component that includes a set of executable instructions that, if executed by one or more processors, fulfills requests by making service calls to resource services may process this notification as described below. The worker may take the action requested by the infrastructure management service 504, and respond by applying a 'put' command on a result document to the pre-signed S3 URL that the infrastructure management service included in the corresponding change notification. In an embodiment, the infrastructure management service's notification also includes temporary credentials, which are scoped down to the permission that are necessary to fulfill the infrastructure management service's request. Because LPT's drivers are used to handle custom resources 506 (e.g., resources not natively supported by a computing resource service provider), the permissions needed may include the ability to assume a role (e.g., the customer's user). In an embodiment, a role can be assumed in the manner described in accordance with FIG. 7.

In an embodiment, a synthesis engine 508 is responsible for executing template resource changes as a result of an infrastructure change set execution. In an embodiment, the worker is a program (e.g., a Ruby-based program) that polls an SQS queue for work (e.g., work items produced from a notification service topic registered to the self-service resource in infrastructure management service).

In an embodiment, the synthesis engine 508 performs a template synthesis process (e.g., LPT Synthesis) for programmatically creating and configuring of resources such that service teams may model their services and resource configurations as high-level abstractions in code and run the synthesis process (e.g., LPT Synthesis) to create and/or configure the resources as specified. In an embodiment, a template package (e.g., a LPT package) is a Brazil package that contains the pipeline template code (e.g., LPT code) for a specific pipeline. In an embodiment, an application definition document or a template is a generic document model generated from a pipeline template package (e.g., an LPT package) describing the entire service resource configuration in a human-readable format such as JavaScript Object Notation (JSON) format. In an embodiment, the template is generated by LPT Synthesis during build time, and is used as an intermediate format to call downstream services to configure resources. In an embodiment, the worker makes use of existing LPT Synthesis drivers to make resource changes, which may involve assuming a role 510 to obtain a token credential corresponding to a customer user to make service calls (e.g., the credentials vended by an infrastructure management service as part of the resource request). Service calls may be made in connection with obtaining, accessing, changing, or otherwise interacting with resources 512 that are natively supported by a computing resource service provider. In an embodiment, the worker is implemented in an extensible manner—for example, rather than implementing a hardcoded list of SQS queues to integrate with, the worker may, instead determine at run time, a full environment, deployed on the host as part of a manifest that includes a cell number; use the information to construct a name for a material set deployed to the cell, including the cell's account credentials; determine the cell's account ID (e.g., via an API call); programmatically construct resource names related to the cell using the account identifier in combination with the information obtained from the material set.

In an embodiment, partitioned synthesis refers to a process for selectively creating resources and can be utilized to improve the safety of pipeline template synthesis (e.g., LPT synthesis) by allowing clients to gradually synthesize applications and resources as opposed to creating all resources at once—creating all resources in a single step could risk a global outage with a single bad change. When performing a synthesis operation, parameters may be specified to select the dimension (e.g., region or zone), logical state, and sub-environment where the resource should be created. In an embodiment, partitioned synthesis enables a client to choose which resources will be created and in what manner, and enables clients to construct resources in a controlled, iterative manner, which reduces the risk and impact of outages.

In an embodiment, a partition may refer to metadata associated to resources defined in a pipeline template which declares where the resource should be created. In an embodiment, a partition comprises a dimension field, a stage field, and a sub-environment field. In an embodiment, the partition further comprises a custom field that allows partitioning of resource beyond the aforementioned fields. In an embodiment, partitioned synthesis occurs in multiple phases to address creation of global resources and partitioned resources in a controlled manner. In an embodiment, during a first phase, global resources that do not depend on partitioned resources are created; during a second stage, partitioned resources are then created; and during a third stage, global resources that depend on partitioned resources are created and/or updated.

In an embodiment, a filter is used to select resources whose partition satisfies a filter criteria, wherein the filter may take on the same form as a partition—for example, a filter may comprise a dimension field, a stage field, a sub-environment field, and a custom field. In an embodiment, one or more of these fields may be empty, support a nil field (which may be treated the same or differently as compared to an empty field), wildcards, and more. In an embodiment, the nil filed is treated differently as a partition field and as a filter field—for a partition, nil declare that the vector should be ignored during filtering, which may be treated like a wildcard; for a filter, nil may specifically require that the partition specify nil for that vector.

In an embodiment, filtering logic may refer to the rules for which resources are tested against a given filter—if the resource's partition satisfies the filter, the resource is kept. In an embodiment, a resource satisfies a filter if the following are true: for each vector of a partition where the value is not nil, the value must equal the corresponding filter vector. More specifically, if a partition vector is set to nil, the corresponding filter vector may have any value, and if the filter vector is set to nil, the corresponding partition vector must also be nil. In an embodiment, all filter vectors must be explicitly set (e.g. to a specific value, to nil). In an embodiment, values not specified in a filter vector may be assumed to be nil and values that are not specified in a partition vector are not assumed to be nil—these differing behaviors may be attributed to the differing treatment of nil in filter vectors and partition vectors. Accordingly, an application pipeline managed using LPT Synthesis can be converted to a composite pipeline by updating an existing LPT template using techniques described below.

In an embodiment, application definition support for partitioning can be implemented using annotated domain objects. In an embodiment, each partition-enabled domain object includes a partition attribute that indicates the partition information, such as the dimension, stage, and sub-environment fields. In an embodiment, the partition information may be encoded in a JSON file, for example, in the following format:

```
{
    "capacity": {
        "auto_scaling_groups": [
            {
                "partition": {
                    "dimension": "PDX",
                    "stage": "PreProd",
                    "sub_environment": null
                },
                "name": "ServiceName/Beta/-/2a-m3-large",
                "tag": "2a-m3-large"
                "ec2_instance_type": "m3.large",
                ...
            }
        ]
    }
}
```

In an embodiment, annotating domain objects in this manner can be backwards compatible and requires no changes to application definition classes, for example, by using meta programming or a mixin. In an embodiment, meta programming may refer to dynamically annotating each domain object with the partition as an instance variable—as it relates to JSON and other similar format, a serialize does not require that attributes be explicitly declared (e.g., the list of an object's instance variables may be dynamically retrieved), with this approach, the partition may be dynamically added to the domain object when it is created, such as in the following manner:
example_domain_object.instance_variable_set('@partition', partition)
In an embodiment, a mixin may refer to a class that includes methods for use by other classes, and each domain class may explicitly include a mixin that declares a partition attribute, such as in the following manner:

```
class PipelineStage
    include Partitionable
end
module Partitionable
    attr_reader :partition
end
```

It should be noted that above example, in JSON format, is merely illustrative of one among many examples for how domain objects may be annotated, and in some cases, illustrate conceptual rather than literal examples of code—for example, the ellipses (" . . . ") shown in the example above pertaining to partition information encoded in JSON format are shown to illustrate that multiple partitions may be annotated in a likewise manner.

In an embodiment, application definition support for partitioning can be implemented using partition domain objects. In an embodiment, an application definition structure is spliced according to the partition, and has the partition built in as part of the structure, such as by encoding a structure (e.g., in JSON format) that indicates a pipeline name, a description, an indication of ownership, an partitions that may be separated, for example, by region.

In an embodiment, FIG. 6 shows an illustrative example of a process 600 for partitioned synthesis, which can be utilized to synthesize various types of resources, including global resources that have dependencies on partitioned resources. In an embodiment, the process 600 is performed by any suitable system using hardware, software, or a combination thereof. In an embodiment, resources are categorized 602 based on the resource type and the dependencies of the resource—for example, there may exist four types of resources: partitioned resources depending on partitioned resources, partitioned resources depending on global resources, global resources depending on global resources, and global resources depending on partitioned resources.

In an embodiment, after dependencies are categorized (e.g., by a synthesizer), the system may determine whether 604 there exist any partitioned resources depending on other partitioned resources. If the system determines that such a type of resource exists, the system may further determine whether 612 the dependencies are from the same partition. In an embodiment, cross-partitioned dependencies are not allowed, and if the system detects that a partitioned resource has a dependency from another partitioned resource, the system may indicate 614 an error, such as by failing a deployment.

In an embodiment, if the partitioned resource depends on other partitioned resource and are from the same partition, the system may proceed to synthesize resources. In an embodiment, the system may synthesize 606 supporting global resources. In an embodiment, supporting global resources may refer to resources where the resource type declares no dependency on another partitioned resource type and the resource does not declare a resource partition—for example, a bindle is a supporting global resource. In an embodiment, all supporting global resources are synthesized prior to the synthesis of partitioned resources. In an embodiment, the supporting global resources are synthesized in a one-phase process such that all global supporting resources for all partitions are created at once.

In an embodiment, the system may synthesize 608 partitioned resources after determining that all supporting global resources have been synthesized. In an embodiment, all partitioned resources are synthesized in this step, but it need not be the case—for example, the step 608 may refer to synthesizing partitioned resources that depend on global resources which may, for example, have been generated in the previous step 606. As an example, partitioned resources may include stages, environments, hostclasses, and more. In an embodiment, partitioned resources are synthesized in a step-per-partition process. In an embodiment, all partitioned resources are synthesized prior to synthesizing aggregate global resources.

In an embodiment, the system may synthesize 610 aggregate global resources after determining that all partitioned resources have been synthesized. In an embodiment, aggregate global resources may refer to resources in which the resource type declares a dependency on a partitioned resource type and does not declare a resource partition—for example, an infrastructure pipeline is an aggregate global resource. In an embodiment, the aggregate global resources are synthesized in a one-phase process such that all aggregate global resources for all partitions are created at once.

Figure 7:
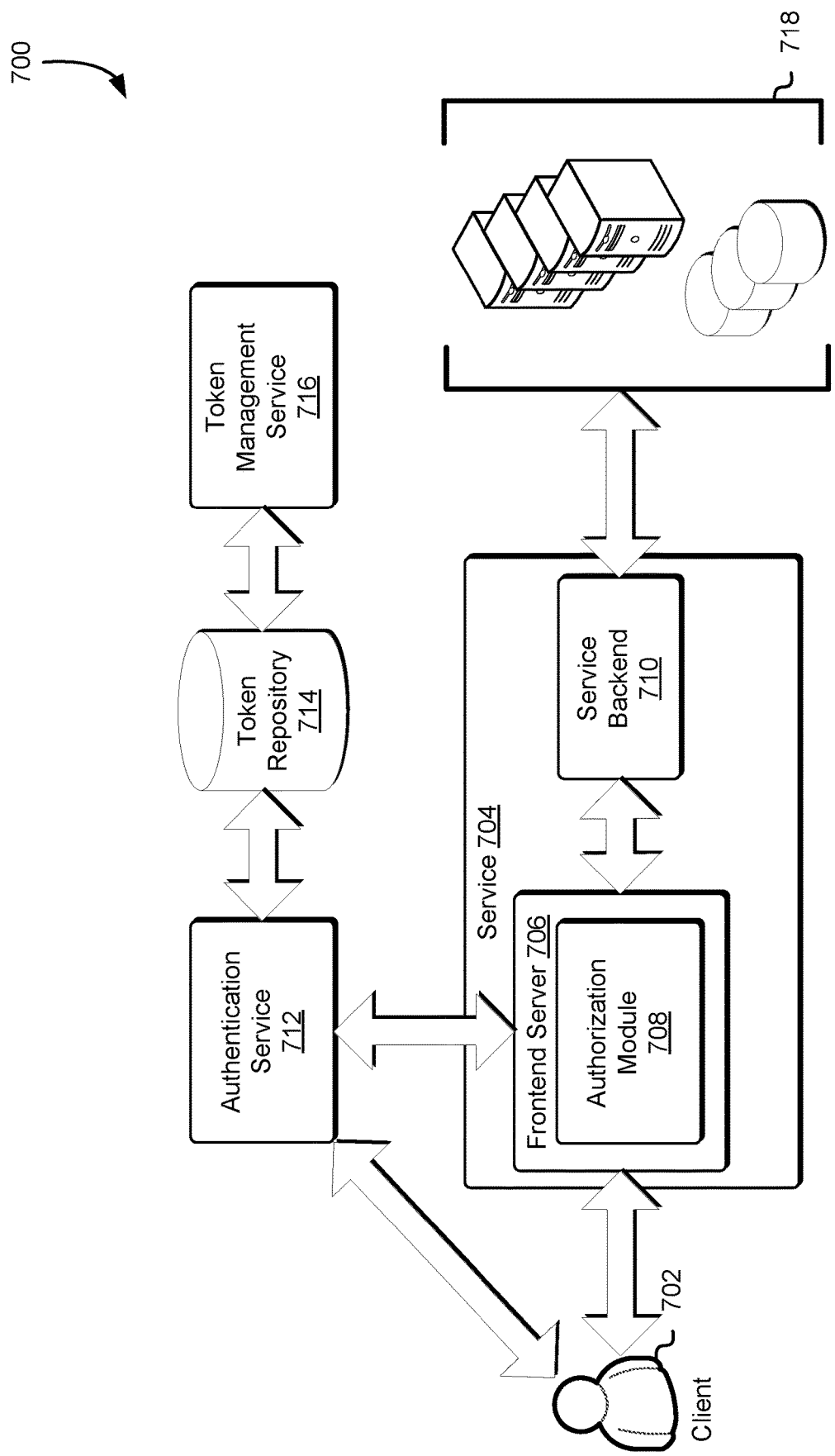
FIG. 7 illustrates an environment for how various components in accordance with several embodiments may be implemented.

FIG. 7 illustrates an environment in which various embodiments can be implemented. The computing environment 700 illustrates a client 702 and a set of computing services that the client may use in various embodiments such as those in accordance with FIG. 5. The environment 700 may further include a service 704, a frontend server 706, an authorization module 708, a service backend 710, an authentication service 712, a token repository 714, a token management service 716, and resources 718.

The client 702 may be any suitable computing entity, such as a synthesis engine as described in connection with FIG. 5. Furthermore, it should be noted that the client 702 may be a user account having a set of credentials (e.g., a username and password) or may be an assumed role. The client may be configured to communicate (e.g., transmit requests and receive responses) from one or more services. In some embodiments, the client 702 may be configured to communicate with a service 704 that may be used to provide access to computer resources as well as an authentication service 712 that enables users to create and use unique identities and authenticate them. However, in some embodiments (not shown in FIG. 7) the client may communicate with a single service or endpoint that provides some or all of the services shown in FIG. 7—for example, a service provider (not shown in FIG. 7) may include both the components shown in the service 704 and authentication service 712 of FIG. 7.

The service 704 may be a service provider that can be used to obtain resources or obtain access to resources. In some embodiments, the service 704 includes a frontend server 706 and a service backend 710, but in other embodiments one or more of the components of the service shown in FIG. 7 may be performed by other components—i.e., the frontend server, service backend, and respective subcomponents therein do not necessarily need to be part of the service 704 but may be in a separate component accessible by the service 704.

The client 702 may communicate with the service 704 using API requests and may assume one or more roles prior to providing an API request. API requests may be handled at least in part by a frontend server 706. The frontend server may be hardware, software, or a combination thereof. Regardless, the frontend server may further include an authorization module 708 or may communicate with an authorization service (not shown in FIG. 7) that may be a subservice of the frontend server or may be a separate component from the frontend server. The frontend server 706 may be configured to receive API requests from a requestor such as the client 702, determine whether to grant the request, and access a service backend 710 to fulfill the request.

The authorization module 708 may be used to determine whether and/or how to fulfill a request and in some embodiments may be a standalone service or a subservice of the frontend server 706 or service 704. An authorization module 708 may determine the permissions associated with a principal requesting access to one or more resources (e.g., resources 718 accessible by a service backend) by parsing a request, determining the permissions associated with the requestor, and determining how to handle the request. The authorization module 708 may use the authentication service 712 to authenticate that the identity of the requestor is who it purports to be. The authorization module may make a determination of whether the requestor should be granted access to one or more resources, for example, by checking security policies attached to the request resource, the requestor, the token, or some combination thereof. As a first example, the resource requested may have a corresponding access control list that describes which principals (e.g., user accounts, groups, roles) may access the resource. The access control list may also include a blacklist of principals that affirmatively may not access the resource and may supersede any other policies ostensibly granting the blacklisted principal access to the resource. As a second example, a security policy may be associated with the requestor or security token. The security policies may reside in a security policy repository (not shown in FIG. 7) that may, for example, be accessible via a database.

The frontend service 706 may be configured to communicate with a service backend 710 that may be used to access one or more resources 718 that may be requested by the client. The resources 718 may be computer or electronic-based resources such as the synthesis engine described in connection with FIG. 5.

The authentication service 712 may be used to perform identity related tasks, such as assuming roles. An authentication service 712 may be a computer system, computer system process, program application, service module, or a combination of these and/or other such computing system entities. The authentication service 712 may be configured to receive API requests from the client and may further support APIs that enable a principal to assume a role. In some embodiments, a principal (e.g., a user account or role) may request to assume a role by specifying the requested role as part of an API request. In some embodiments, the authentication service provides, in response to a request to assume a role, a security token that includes a HMAC having an expiration time.

In some embodiments, the authentication service 712 may communicate with a token repository 714 that may be used to store security tokens or portions thereof. A token repository 714 may be implemented using one or more databases, or other types of structured storage. In one case, the token repository may have a database that may be structured as follows: a first role table such that each row of the table corresponds to a role. The role may further include a data column that includes the security token associated with the role. In some embodiments, the data column may include an HMAC. Each row of the role table may include a primary key identifier that uniquely identifies a row. A second associate table may store, in each row of the second table, a reference to a principal (e.g., a resource name identifier) and a reference to a column in the role table correspond to a role that the principal may assume. There may be multiple rows in the associate table for a given principal if the principal may assume multiple roles—e.g., one row for each role the principal may assume. In some embodiments, authentication service 712 may manage the token repository and determine which roles a principal may assume.

A token management service 716 may be used to perform operations related to the management of security tokens. The token management service may generate a security token (e.g., a HMAC) when a role is created. The token management service may further have access to a cryptographic key that may be used for generating HMACs. However, in other embodiments, the separate cryptography service may be used to generate HMACs. An HMAC may be generated using various one-way hash functions such as a secure hash algorithm (e.g., SHA-256 algorithm).

In some embodiments, one or more components may communicate using a cryptographically protected communication session. A cryptographically protected communication session may refer to a communication or set of communications wherein one or more assurances as to the attributes of the communication(s) may be made based on the use of cryptographic properties and/or cryptographic algorithms. For example, a cryptographically protected communication session may, for messages received over the cryptographically protected communication session, provide assurances of authenticity, integrity, confidentiality, or any combination thereof. Authenticity may refer to assurances that the message was created by a party purporting to be the author of the message. Integrity may refer to assurances that the received message was not modified either intentionally (e.g., by a malicious party) or unintentionally (e.g., as a result of signal loss during transmission) from its original form when the message was transmitted. Confidentiality may refer to assurances that the message may only be understood by the recipient and/or other intended parties (e.g., by transmitting an encrypted message that may only be decrypted by the recipient).

In an embodiment, various entities described in the present disclosure make use of various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Figure 8:
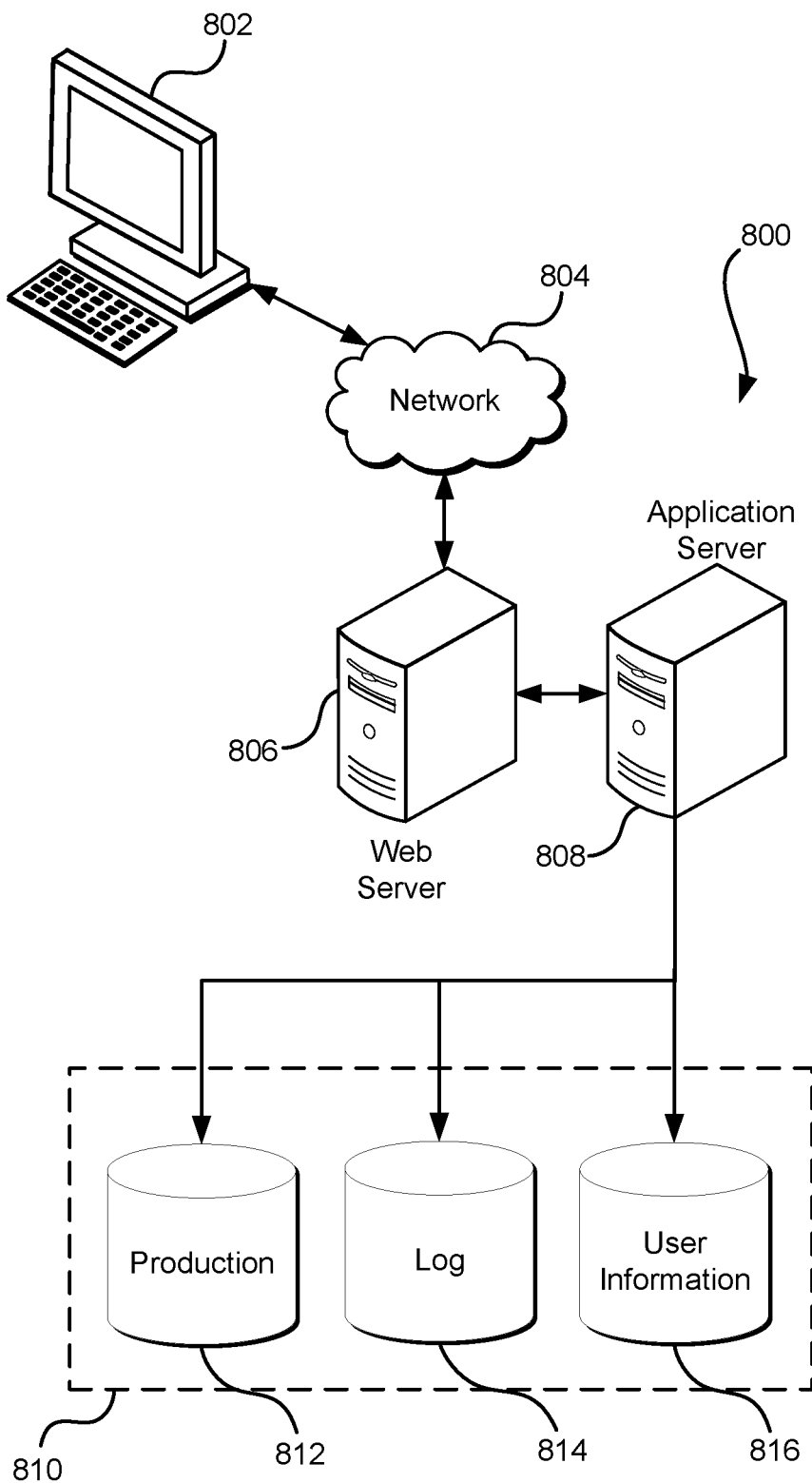
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting a change associated with a template of a plurality of templates, the template of the plurality corresponding to a stage of a plurality of stages in a deployment, wherein the template includes application code and a configuration of a set of computing resources;

29 assigning, in response to detecting the change based at least in part on the plurality of templates, at least a first subset of the set of the computing resources and a second subset of the set of the computing resources for deploying to respective stages of the plurality of stages, the second subset different from the first subset;

based at least in part on assigning the first subset and second subset, submitting a request to deploy a resource of the respective subset of the set of computing resources;

utilizing the resource to execute an application determined based at least in part on the application code;

determining the application executed with one or more metrics indicative of a passing rate; and assigning, based at least in part on the passing rate, a second set of computing resources to an additional template corresponding to a second stage of the plurality of stages.

2. The computer-implemented method of claim 1, wherein assigning at least the first subset of the set of computing resources or the second subset of the set of computing resources is further based on a detected failure indicated by the passing rate being insufficient as a result of previously executing the application.

3. The computer-implemented method of claim 1, wherein the method further comprises:
validating the application executed with the one or more metrics being indicative of a passing result based at least in part on the passing rate being a sufficient rate; and
wherein assigning the second set of computing resources to the template corresponding to the second stage of the plurality of stages is based at least in part on the passing result.

4. The computer-implemented method of claim 1, wherein the method further comprises:
detecting a plurality of changes associated with the plurality of templates, the changes occurring within a time period; and
disabling, in response to detecting the plurality of changes within the time period, the assignment of resources associated with the plurality of changes.

5. A system, comprising:
one or more processors; and
memory that stores computer-executable instructions that, as a result of execution, cause the one or more processors to:
detect a changed code for a first template corresponding to a stage of a plurality of stages, the first template of a set of templates, wherein the changed code corresponds to an application and a configuration of computing resources;
provision, based at least in part on the changed code, a first portion of a set of resources to be associated with the first template;
transmit a request to deploy the provisioned resources to an execution environment;
determine the provisioned resources deployed to the execution environment with one or more metrics indicative of a passing rate; and
assign, based at least in part on the passing rate, a second portion of resources to a second template corresponding to an additional stage of the plurality of stages.

6. The system of claim 5, wherein the instructions to provision the first portion of the set of resources, as a result of execution by the one or more processors, cause the system

30 to run one or more unit tests to determine how the changed code affected how an application executes.

7. The system of claim 5, wherein the instructions to detect the changed code, as a result of execution by the one or more processors, cause the system to detect that one or more tests failed at a particular stage of the plurality of stages.

8. The system of claim 5, wherein the instructions further include instructions that, as a result of execution by the one or more processors, further cause the system to:
determine the one or more metrics by corresponding one or more tests based at least in part on a first stage; and
transmit an indication to a separate computer system to run the one or more tests using at least the first portion of the set of resources.

9. The system of claim 5, wherein the changed code is encoded using a structured markup language.

10. The system of claim 5, wherein the instructions to provision the first portion of the set of resources, as a result of execution by the one or more processors, cause the system to:
determine whether the first resource is dependent on an additional resource; and
assign, when the resource is dependent, the additional resource to the respective stage associated with the resource.

11. The system of claim 5, wherein the instructions to provision the first portion of the set of resources, as a result of execution by the one or more processors, cause the system to:
determine the first portion of the set of resources comprises a global resource; and
assign the first portion of the set of resources to be utilized before at least the second portion of the set of resources.

12. The system of claim 5, wherein the instructions to provision the first portion of the set of resources, as a result of execution by the one or more processors, cause the system to:
determine the first template is associated with a region; and
provision the first portion of the set of resources according to the changed code when the resource is not currently utilized within the region.

13. A non-transitory computer-readable storage medium comprising executable instructions that, as a result of being executed by one or more processors of a computer system, cause the computer system to at least:
determine, in response to a detected change in a template of a plurality of templates corresponding to a stage of a plurality of stages in a deployment, a configuration of a set of resources to be deployed at the stage of a plurality of stages, wherein the detected change relates to application code and a computing resource of the set of resources;
provision, based at least in part on the configuration, a subset of the set of resources to the stage of the deployment;
transmit a request to deploy the provisioned subset of the set of resources;
detect the provisioned subset deployed with one or more metrics indicative of a passing rate; and
assign, based at least in part on the passing rate, a second subset of the set of resources to an additional template corresponding to an additional stage of the plurality of stages.

14. The non-transitory computer-readable storage medium of claim 13, wherein the executable instructions further comprise instructions that, as a result of execution by the one or more processors of the computer system, further cause the computer system to:
- detect a change to a source code including one or more parameters associated with the set of resources, wherein the parameters indicate the subset of the set of resources to be deployed; and
- provision, for the stage of the deployment, machine readable code associated with the source code, the machine readable code, as a result of execution, utilizes at least some of the subset of the set of resources.

15. The non-transitory computer-readable storage medium of claim 13, wherein the executable instructions that cause the computer system to determine the configuration of the set of resources include instructions that cause the computer system to order deploying the set of resources based at least in part on dependencies associated with the set of resources.

16. The non-transitory computer-readable storage medium of claim 13, wherein the executable instructions that cause the computer system to transmit a request to deploy the provisioned subset of the set of resources include instructions that cause the computer system to receive, via a graphical user interface, an indication of an approval to provision a second stage of the deployment.

17. The non-transitory computer-readable storage medium of claim 13, wherein the executable instructions that cause the computer system to provision the subset of the set of resources comprise instructions that, as a result of execution by the one or more processors, cause the system to:
- determine whether the resource is a global resource or a partitioned resource;
- determine, in response to determining that the resource is a global resource, whether the global resource is dependent on one or more partitioned resources; and
- provision, in response to determining the global resource is dependent, the global resource after provisioning the one or more partitioned resources.

18. The non-transitory computer-readable storage medium of claim 13, wherein the executable instructions further comprise instructions that, as a result of execution by the one or more processors, further cause the system to determine that one or more changes to a source code are associated with a version change.

19. The non-transitory computer-readable storage medium of claim 13, wherein the executable instructions further comprise instructions that, as a result of execution by the one or more processors, further cause the system to:
- determine permissions sufficient to deploy the resource; and
- provide the permissions as part of the request.

20. The non-transitory computer-readable storage medium of claim 13, wherein the instructions further comprise instructions that, as a result of execution by the one or more processors, further cause the system to fulfill the request in response to determining that fulfilling the request is allowed by a security policy.

* * * * *